Oct. 5, 1965    J. KIRSCH    3,210,063
HYDROPNEUMATIC SUSPENSION SYSTEM
Filed Dec. 31, 1962    3 Sheets-Sheet 1

INVENTOR.
JERRY KIRSCH
BY
Barthel & Bugbee
ATTORNEYS

Oct. 5, 1965   J. KIRSCH   3,210,063
HYDROPNEUMATIC SUSPENSION SYSTEM
Filed Dec. 31, 1962   3 Sheets-Sheet 2
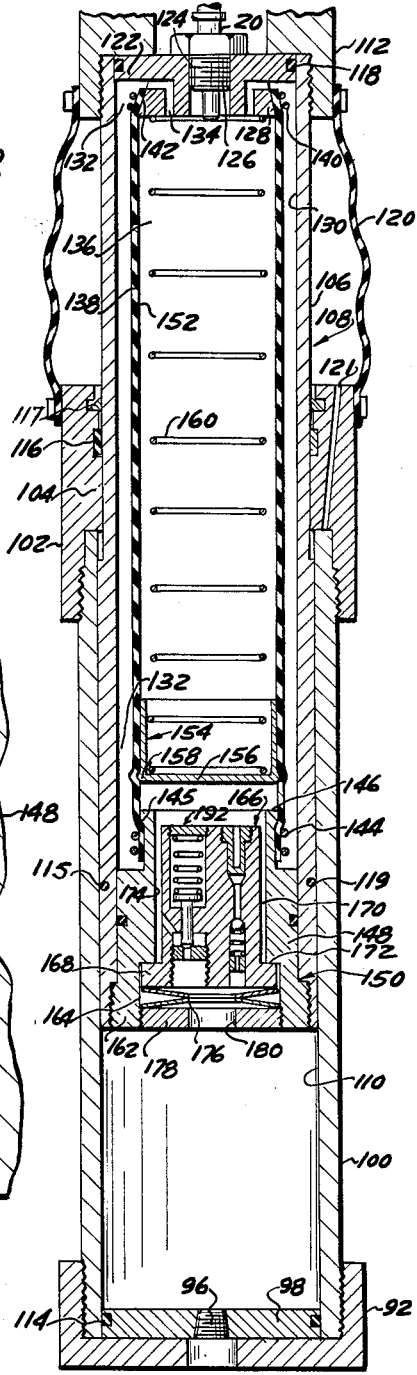
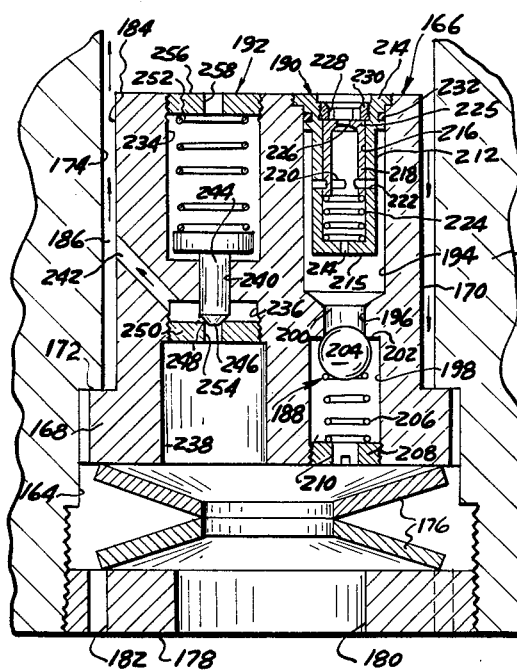
INVENTOR.
JERRY KIRSCH
Barthel & Bugbee
BY   ATTORNEYS

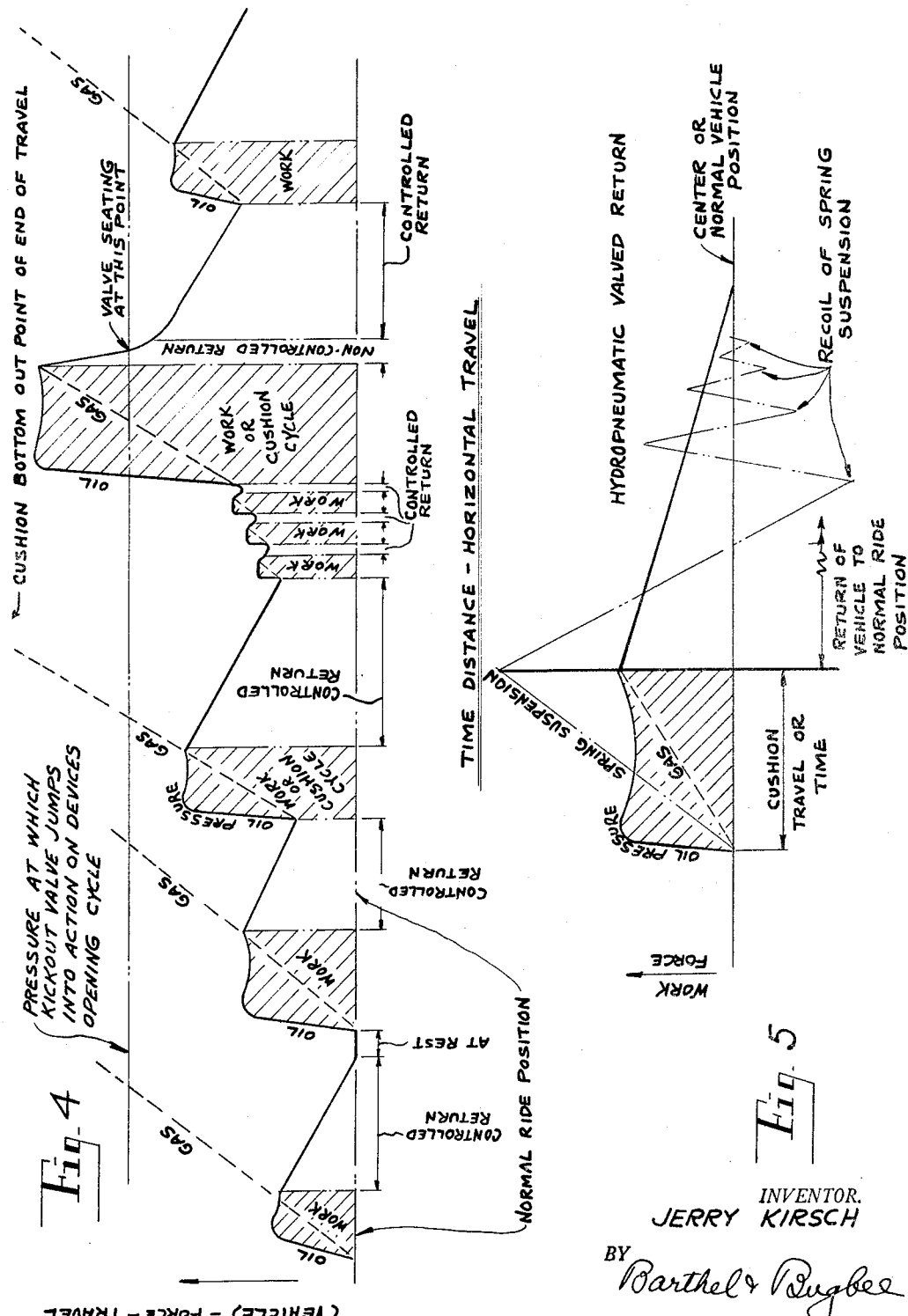

United States Patent Office

3,210,063
Patented Oct. 5, 1965

3,210,063
HYDROPNEUMATIC SUSPENSION SYSTEM
Jerry Kirsch, 3946 Bishop Road, Detroit, Mich.
Filed Dec. 31, 1962, Ser. No. 248,587
5 Claims. (Cl. 267—64)

This invention relates to vehicle suspensions and, in particular, to hydropneumatic vehicle suspensions, whereine the road shocks are absorbed by mechanism employing a combination of hydraulic and pneumatic fluids.

Hitherto, vehicle suspension systems for the most part have employed leaf or coil springs of various types arranged between the vehicle axles or axle housings and the vehicle chassis to cushion and absorb shocks imposed upon the wheels and axles by bumps or chuck holes in the road over which the vehicle is traveling. Such prior suspensions have also employed shock absorbers in addition to these springs in the attempt to reduce the sharp closing and opening or rebound actions otherwise possessed by metallic springs alone. It is characteristic of such spring suspensions and to a lesser degree those additionally equipped with shock absorbers, that both the cushioning action upon encountering road irregularities and the rebound action of the suspension are too abrupt for the comfort of the passengers and the road-holding qualities of the vehicle, mainly because of the lack of controlled retardation of the compression and consequent expansion of the suspension springs upon rebound.

Accordingly, one object of this present invention is to avoid these defects of prior suspensions by providing a hydropneumatic vehicle suspension possessing a controlled closing for shock absorption and a controlled opening for rebound so as to level off the road shocks and render more gradual their effect upon the vehicle as the vehicle chassis rises from and returns to its normal traveling position relatively to the vehicle undercarriage.

Another object is to provide a hydropneumatic vehicle suspension of the foregoing character wherein hydropneumatic reciprocatory motors are interposed between the vehicle under-carriage and body frame in such a manner that a bump in the road pushes the wheel and axle upward, causing relative motion between the hollow piston and cylinder of the motor and forcing hydraulic fluid through a controlled orifice in the piston head into the hollow piston against a floating or free piston reciprocable therein and opposed by a compressed gas on the opposite side of the floating piston within the hollow piston rod of the hollow piston, the flow of hydraulic fluid out of the hollow piston into the cylinder upon rebound of the wheels and axle being retarded by a flow retardation device according to a predetermined rate of flow, preferably at a constant speed, as the gas pressure behind the floating piston forces the hydraulic fluid from the hollow piston rod back into the cylinder.

Another object is to provide a hydropneumatic vehicle suspension of the foregoing character wherein the flow retarded return flow of the hydraulic fluid is controlled by a spring-urged pressure-responsive flow retardation valve which restricts the return flow of hydraulic fluid more effectively at the beginning of the rebound or return stroke than toward the end thereof, and thereby "levels out" and cushions the impact and rebound shocks.

Another object is to provide a hydropneumatic vehicle suspension of the foregoing character wherein the flow control valve is mounted in the head of the hollow piston, where it effects direct control of the flow of fluid through this piston head.

Another object is to provide a hydropneumatic vehicle suspension of the forgoing character wherein the flow retardation valve is itself mounted in a movable body within the piston head of the hollow piston, the movable body itself being normally urged against a valve seat by a spring device which normally maintains this body in closing engagement with the valve seat at most of the pressures produced by the majority of road bumps or holes, but which yields as a pressure relief valve upon the encountering of shocks arising from road bumps or holes of excessive height or depth respectively, or of several such road irregularities encountered in rapid succession, thereby releasing hydraulic fluid from the hollow piston into the cylinder in response to the arising of abnormal pressures due to excessive road shocks.

Another object is to provide a hydropneumatic vehicle suspension, wherein the hollow piston rod of the hollow piston containing the floating or free piston is of resilient material such as elastic deformable material, for example, natural or synthetic rubber, and wherein gas pressure from inside this resilient tubular piston rod is conducted to the exterior thereof to press the walls of the resilient piston rod tightly but yieldably against the side walls of the free piston so as to prevent leakage of hydraulic fluid past the floating or free piston.

Another object is to provide a hydropneumatic vehicle suspension of the foregoing character wherein means is supplied for replenishing hydraulic pressure fluid, such as oil, to the hydraulic cylinder, either from a hydropneumatic accumulator which is precharged with gas at a predetermined pressure, or by a hydraulic pump, the same arrangement also serving to increase or decrease the road clearance of the vehicle by raising or lowering the vehicle body frame and body structure relatively to the under carriage.

Other objects and advantages of the invention will become apparent during the course of the following description of the accompanying drawings, wherein:

FIGURE 2 is an enlarged central vertical section through the hypopneumatic suspension motor shown in FIGURE 1, with the piston head valve assembly shown in central vertical section;

FIGURE 3 is a still further enlarged central vertical section through the suspension motor piston head shown in FIGURE 2;

FIGURE 4 is a graph showing diagrammatically the action of the hydropneumatic suspension of this invention responding to the encountering of successive road shocks during travel of the vehicle; and FIGURE 5 is a graph showing diagrammatically the contrasting action of a conventional spring suspension on a similar test ride.

Figure 1:
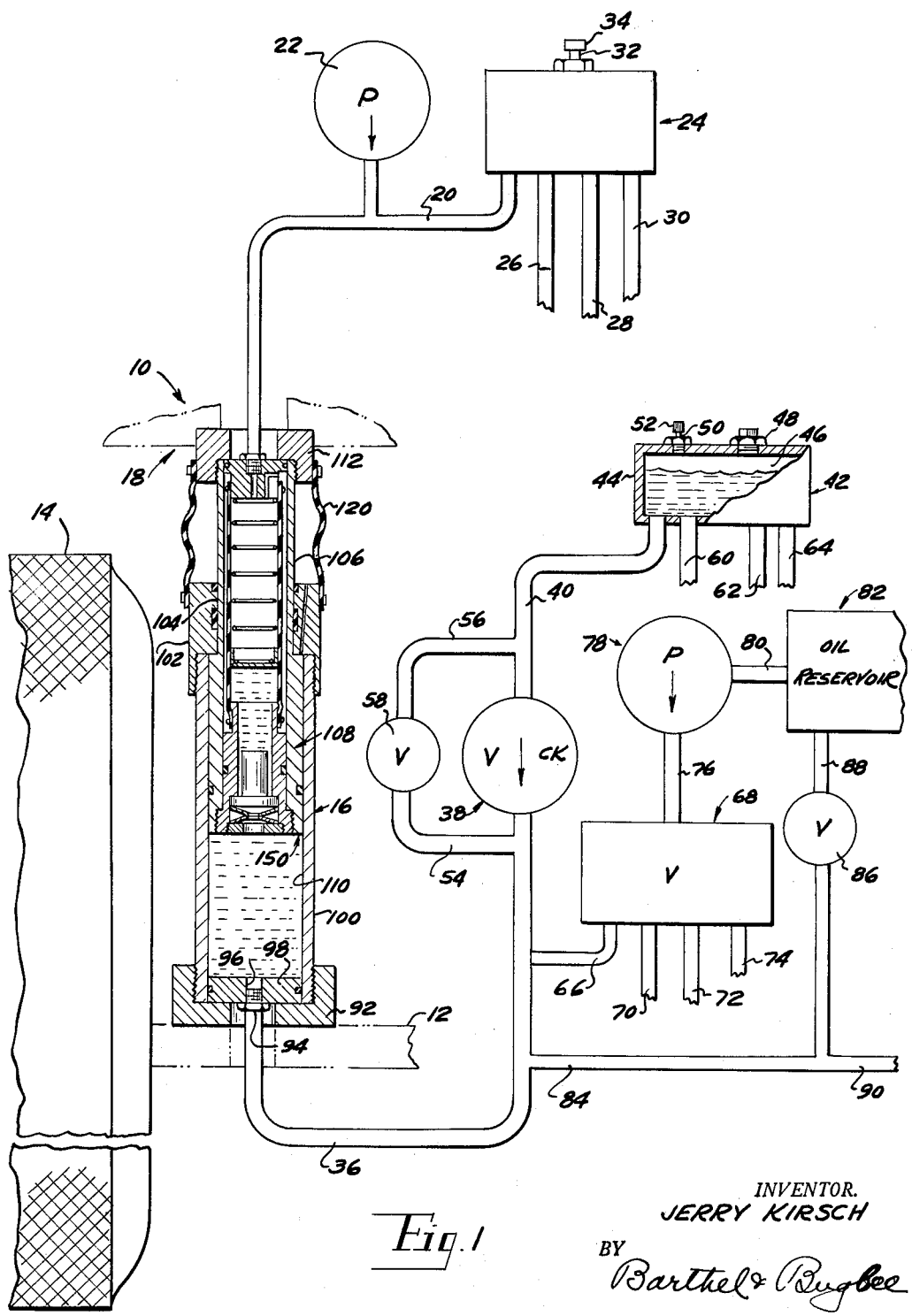
FIGURE 1 is a diagrammatic view of one side of a hydropneumatic vehicle suspension, with controlled compression and rebound, according to one form of the invention, with the hydropneumatic suspension motor shown in central vertical section.

Referring to the drawings in detail, FIGURE 1 shows diagrammatically one corner of a vehicle suspension, generally designated 10, including one end of a front axle 12 rotatably supporting a rubber-tired wheel 14. The usual steering knuckle, kingpin, arm and cross link have been omitted from the drawing to simplify the showing. Mounted upon the axle 12 near one of its opposite ends is a hydropneumatic suspension motor, generally designated 16, according to the present invention and connected at its upper end to the vehicle body structure or frame, generally designated 18. It will be understood that a similar hydropneumatic suspension motor 16 is mounted near the opposite end of the front axle 12 and that a pair of such suspension motors 16 are mounted near the opposite ends of the rear axle structure (not shown). The upper end of the hydropneumatic motor 16 is connected by a distribution pipe 20 to an air pump 22 and beyond the air pump 22 to a gas distribution manifold 24 from which other distribution pipes 26, 28 and 30 run to the three remaining hydropneumatic suspension motors 16 (not shown) mounted adjacent the three remaining wheels of the vehicle. The distribution manifold 24 is also provided with an inlet valve 32 of the type employed on pneumatic tires and adapted to receive the air hose coupling nozzle attached to compressed air hoses at gasoline filling stations, for the purpose of charging the gas in the hydropneumatic motor 16 from such an air hose without the necessity of using the air pump 22. The inlet valve 32 is normally closed by a removable cap 34 threaded thereon in the usual way.

From the lower end of the hydropneumatic motor 16 a pipe 36 runs to a downwardly-opening check valve 38, whence the pipe 40 runs to a hydropneumatic accumulator 42 consisting of a structurally strong casing 44 containing at its upper end a compressed gas chamber 46 and also drilled and threaded to receive an oil replenishment plug 48 and a gas filling valve 50 similar to the valve 32 and similarly closed by a removable cap 52 threaded thereon. The check valve 38 is bypassed by pipes 54 and 56 containing a manually-operated bypass valve 58 which is kept normally closed but which can be opened to permit oil or other hydraulic fluid to flow from the lower end of the hydropneumatic suspension motor 16 back to the accumulator 42 without being blocked by the check valve 38. From the accumulator 42 pipes 60, 62 and 64 lead to the lower ends of the three other hydropneumatic suspension motors (not shown) to maintain the oil or other hydraulic fluid therein at a similar pressure to that maintained in the lower end of the hydropneumatic suspension motor 16.

From the pipe 36 between the hydropneumatic motor 16 and the check valve 38, a pipe 66 leads to an oil distribution valve, generally designated 68, from which other distribution pipes 70, 72 and 74 lead to similar locations on the three other hydropneumatic suspension motors (not shown). From the oil distribution valve 68, a pipe 76 leads to a hydraulic pump 78 from which a pipe 80 leads to an oil reservoir 82. Also from the pipe 36 below the check valve 38, a pipe 84 leads to a manual valve 86 from whence a pipe 88 leads to the oil reservoir 82 so as to permit return of the oil from the hydropneumatic suspension motor 16 to the oil reservoir 82, such as, for example, to partly collapse the hydropneumatic suspension motors 16 in order to reduce the road clearance of the vehicle. A branch pipe 90 leads from the pipe 84 to similar locations on the remaining hydropneumatic suspension motors 16.

Each hydropneumatic motor 16 consists of a lower cylinder head 92 mounted on and secured to the axle 12 in any suitable way, such as by bolting, with or without ball joints or other self-aligning connections. Such connections are well known in the suspension art and the particular connection depends on the choice of the designer. For purposes of simplification of the drawing and description, and in order to avoid detracting attention from the main features of the invention, which reside elsewhere, no particular such connection is shown other than the cylinder head 92 abutting the axle 12.

The cylinder head 92 and axle 12 are bored for the passage of the pipe 36 to a threaded connection 94 thereof with a threaded port 96 in the inner head or closure disc 98. The latter is tightly secured in the lower end of the outer or main cylinder 100 (FIGURES 1 and 2), the lower end of which is threaded into the internally-threaded cup-shaped lower cylinder head 92. The upper end of the cylinder 100 is similarly threaded externally and is threaded into an internally-threaded annular upper cylinder head 102 having a central bore 104 therethrough for the passage of the tubular hollow piston rod 106 of a hollow main piston, generally designated 108, which is reciprocably mounted within the bore 110 of the main cylinder 100. The upper end of the hollow piston rod 106 is externally threaded and threaded into an annular piston rod cross head or mounting block 112 of internally-threaded cup-shaped form. Suitable conventional leakage prevention packings, such as O-rings, are provided at 114, 115 and 118 in the lower cylinder head 92 and inside the opposite ends of the hollow piston rod 106 respectively, and at 119 outside the latter. The upper cylinder head 102 is spacedly grooved to receive a piston rod guide bearing 116 of nylon or other suitable bearing material, and a scraper ring 117 respectively.

Clamped to the cross head 112 and upper cylinder head 102 are the upper and lower ends of a flexible protective boot or bellows 120. A port 121 leads through the upper cylinder head 102 to the interior of the boot 120. The upper end of the hollow piston rod 106 is closed by an inner closure disc 122 which is bored centrally and threaded as at 124 to receive a threaded pipe connection fitting 126 to which the lower end of the pipe 20 is connected. Extending downwardly and inwardly from the closure disc 122 is a tapered boss 128 of smaller diameter than the piston rod bore 130 so as to leave an annular space 132 between it and the hollow piston rod 106. The boss 128 is provided with L-shaped passageways 134 leading from a compressed gas chamber 136 within a resilient tubular member 138 to the annular space 132 outside the tubular member or sleeve 138 which, like the boss 128, is also of smaller diameter than the hollow piston rod bore 130 so as to continue the annular space or chamber 132 therebetween. The upper end of the resilient sleeve 138, which is preferably of elastic deformable material, such as natural or synthetic rubber or resilient synthetic plastic, is secured tightly as by the rings or wires 140 to the conical outer surface 142 of the boss 128.

The lower end of the resilient sleeve 138 (FIGURE 2) is tightly secured as by the rings 144 below the annular enlargement 145 of the reduced diameter upper end portion 146 of the tubular outer component 148 of the piston head, generally designated 150, of the hollow piston 108. The resilient sleeve 138 has a cylindrical inner surface which in effect acts as a bore 152 in which is reciprocably mounted a cup-shaped free piston or floating piston 154, the head 156 of which is provided with an annular enlargement 158 engaging the resilient sleeve 138 so as to slightly deform the latter during reciprocation of the floating piston 154. The floating piston head 156 serves as an abutment for the lower end of a weak helical spring 160 of relatively low force adapted to urge the floating piston 154 downward within the resilient sleeve bore 152 and overcome the frictional drag otherwise occurring between the floating piston 154 and the resilient sleeve 152.

The lower end of the hollow piston rod 106 is counterbored and internally threaded to receive the correspondingly-externally-threaded enlarged lower end portion 162 of the outer component 148 of the piston head 150, and the latter in turn is counterbored as at 164 to receive a bodily reciprocable valve unit 166 (FIGURE 2). The annular enlarged lower end portion 168 of the flanged cylindrical body 170 of the valve unit 166 abuts an annular valve seat 172 between the counterbore 164 and the reduced diameter central bore 174 of the outer piston head component 148. Dished or convexo-concave spring washers 176 of the so-called Schnorr or Belleville type well known to those skilled in the mechanical field urge the annular enlargement or flange 168 against the valve seat 172 and are held in position by an externally-threaded annular retaining disc 178 threaded into the internally-threaded outer end of the counterbore 164. The retaining disc 178 is provided with a central opening 180 which communicates with the counterbore 164, and multiple peripherally-spaced ports 182 (FIGURE 3) are additionally provided in the peripheral portion of the retaining disc 178.

The body 170 of the valve unit 166 (FIGURE 3)

above its lower end portion 168 is provided with a reduced diameter portion 184 of lesser diameter than the bore 174 in the outer piston head component 148 so as to provide an annular fluid passageway 186 therebetween. Mounted within the body 170, in series with one another, are a downwardly-opening check valve 188 and a flow retardation valve 190, preferably a constant speed flow control valve, with which the check valve 188 is associated. Also mounted within the body 170 is a spring-urged auxiliary flow control valve 192. The constant speed flow control valve 190 is mounted in the upper end portion 194 of a longitudinal or axial bore 196 extending through the body 170 and having a lower portion 198 separated from the upper portion 194 by a restricted portion 200 providing a valve seat 202 for the valve member or ball 204 of the check valve 188. The ball 204 is urgedly upwardly against its seat 202 by a helical compression spring 206, the lower end of which abuts an externally-threaded annular screw plug 208 threaded into the internally-threaded lower end of the bore portion 198. The screw plug 208 has a central passageway 210 therethrough connecting the bore portion 198 to the counterbore 164.

The constant speed flow control valve 190 is housed in a tubular valve body 212 (FIGURE 3) which has at its upper end an annular enlargement 214 externally threaded to fit into the internally-threaded counterbored upper end of the upper bore portion 194 of the bore 196. The valve body 212 is cup-shaped and in its lower end wall 215 contains an end port 214 and also contains a cylindrical bore 216, with which the end port 214 communicates. Reciprocably mounted within the valve bore 216 is a sleeve valve member 218 having near its lower end an arcuate wall port 220 adapted to register in wide open relationship with a side wall port 222 in the valve body 212 when the sleeve valve member 218 is in its uppermost position (FIGURE 3) to which it is urged by the helical compression spring 224 mounted in the lower portion of the tubular valve body 212. The upper end wall 225 of the sleeve valve member 218, which is of approximately inverted cup-shaped form, is provided with a port 226 communicating with a port 228 in an externally-threaded closure plug 230 threaded into the internally-threaded counterbored upper end of the bore portion 194. Leakage is prevented by an O-ring 232 between the valve body 212 and the bore 194.

The auxiliary flow control valve 192 occupies the upper portion 234 (FIGURE 3) of a bore 236, the axis of which is parallel to that of the bore 196 containing the check valve 188 and the constant speed flow control valve 190. The lower portion 238 of the bore 236 is connected to the upper portion 234 through a restricted bore 240, and an oblique passageway 242 extends from the upper end of the lower bore portion 238 to the annular space 186 between the reduced diameter portion 184 of the valve body 170 and the bore 174 in the outer component 148 of the cylinder head 150. Reciprocably mounted in the restricted bore portion 240 of the bore 236 is a headed valve plunger 244, the conical lower end 246 of which is urged downwardly against a valve seat 248 in an externally-threaded valve seat disc 250 by a helical compression spring 252. The valve seat disc 250 is threaded into the counterbored upper end of the bore portion 238 and contains a central port 254 leading from the valve seat 248 to the bore portion 238. The upper end of the spring 252 abuts an externally-threaded screw plug 256 threaded into the upper end of the bore portion 234 and contains a central port 258.

In the operation of the invention, let it be assumed that the lower ends of the four hydropneumatic suspension motors 16 have been filled with a suitable hydraulic fluid, such as oil, also that the compressed gas chamber 136 within the resilient sleeve 138 has been charged with a compressed gas, such as compressed air or nitrogen. When the wheels 14 of the vehicle encounter a bump, the resulting shock jerks upward the axle 12 and the cylinder 100 connected to it, while the inertia of the body structure 18 momentarily delays upward motion of the hollow piston 108 and the cross head 112 connecting it to the vehicle body structure 18. This action results in a partial closing of the hydropneumatic suspension motor 16 by the relative motion of the main cylinder 100 and hollow piston 108 toward one another, during the course of which hydraulic fluid from the lower end of the cylinder 110 is forced upward through the ports 180 and 182 and counterbore 164 and bore portion 238 through the port 254 against the lower end 246 of the plunger 244 of the auxiliary flow control valve 192. The pressure of the hydraulic fluid raises the valve plunger end portion 246 off its seat 248 against the downward urge of the compression spring 252, permitting the hydraulic fluid to flow through the oblique passageway 242 and annular space 186 between the valve body 170 and bore 174 into the lower end of the hollow resilient sleeve 152 beneath the floating piston 154. This pressure fluid acts against the floating piston head 156, forcing the piston 154 upward within the bore or chamber 152 against the downward urge of the spring 160, further compressing the already compressed gas in the upper end of the resilient sleeve 150.

The further compression of the gas in the upper end of the resilient sleeve 138 cushions the shock of the impact of the wheel 14 with the roadbed bump or hole, smoothing out the sharpness which this shock would otherwise impart to the vehicle body structure 18. At the same time, the communication of the annular chamber 132 outside the sleeve 138 with the interior thereof through the passageways 134 in the head 122 urges the resilient sleeve 138 against the floating piston 154 in such a manner as to effectively prevent leakage of hydraulic fluid upward or gas downward past the floating piston 154.

Upon the rebound resulting from the wheel 14 returning to its normal position and the consequent opening of the hydropneumatic motor 16 by the relative motion of the main cylinder 100 and hollow piston 108 away from one another, the increased gas pressure within the upper end of the resilient sleeve 138 forces the free piston 154 downward therein as the cylinder 110 moves downward in response to the downward motion of the axle 12 (FIGURE 1). In so doing, it pushes the hydraulic fluid beneath it through the ports 228 and 226 of the constant speed flow control valve 190, into the interior of the sleeve valve member 218 thereof, at the same time acting against the upper end wall 225 to force the sleeve valve member 218 downward, narrowing the width of the resultant opening between the sleeve valve port 220 and its body wall port 222. Thus, in the initial rebound action, the maximum hydraulic pressure is exerted against the sleeve valve member 218, causing the minimum resultant width of the passageway through the ports 220 and 222, whereas when this hydraulic pressure falls as a result of the opening of the suspension motors 16 by the downward motion of their cylinders 100 relatively to their pistons 108, the consequent lessening of the pressure upon the upper end wall 225 of the sleeve valve member 218 causes the opposing spring 224 to push the sleeve valve member 218 upward and increase the effective width of the overlapping ports 220 and 222. Meanwhile, the hydraulic fluid thus reaching the lower end of the bore 194 passes through the restricted bore 200 into the lower bore portion 198, depressing the ball valve member 204 of the check valve 188 against the counterthrust of the spring 206. This action permits the hydraulic fluid to escape from the upper bore portion 194 through the intermediate and lower bore portions 196 and 198, the port 210, the counterbore 164 and the port 180 into the lower end of the hydraulic cylinder 100. As a result of the foregoing action, the rebound and consequent opening of the hydropneumatic suspension motors 16 is retarded in a predetermined manner, greatly smoothing out and decreasing the rebound shock and leveling the ride of the vehicle body structure 18 which would otherwise jump sharply up and down if ordinary suspension springs were used.

In the event of excessive rebound pressures developing above the valve unit 166, the valve body 170 thereof compresses the spring washers 176 and permits its flange 168 to move off the annular seat 172. As a result, hydraulic fluid at excessive pressures is permitted to escape directly from the lower end of the resilient sleeve 138 from beneath the floating piston 154 through the space between the valve body 170 and the bore 174 and thence through the annular space between the flange 168 and counterbore 164, thus "dumping" the excess hydraulic fluid upon the arising of such successive pressures.

In the event of a wheel or wheels 14 encountering a series of bumps or depressions in rapid succession, in such a manner as to give insufficient time for full opening of the hydropneumatic suspension motors 16 upon rebound, the cushioning action described above occurs in successive steps as shown by the progressively rising peaks and valleys of the graph shown in FIGURE 4. Each peak, which is blunted to an almost horizontal plateau or mesa shape by the combined hydraulic and pneumatic action of the hydropneumatic suspension motors 16, is followed by a gradual decline as the suspension tries to return to its normal position, only to be subjected to renewed impact before it reaches the normal position. The shaded area under each blunt peak indicates the work absorbed in cushioning the shock or jolt during the closing of the hydropneumatic motors 16, whereas the unshaded portion which immediately follows the shaded portions and entitled "controlled return" represents the reopening or separation of the piston and cylinders of the hydropneumatic motor 16 during their return or recovery strokes. The level portion of the curve near its left-hand end in FIGURE 4 entitled "at rest" represents the zero or neutral position where the hydropneumatic motors 16 have been enabled to return to the normal riding position before being subjected to another shock or jolt.

The succession of three small flattened peaks seen near the middle of FIGURE 4 represents a rapid succession of small jolts between which insufficient time remains for recovery. The very tall blunt peak immediately following the third small peak represents the effect of a massive or excessive shock which sends the oil or hydraulic pressure soaring above the pressure sufficient to overcome the thrust of the spring washers 176. This causes the excessive pressure to force the valve unit 166 downward bodily so that the flange 168 of the valve unit body 170 is forced downward away from the valve seat 172. The result of this is to release or "dump" the oil or other hydraulic fluid at the excessive pressure during the period indicated by the words "non-controlled return" until the thrust of the spring washers is sufficient to overcome the downward thrust and return the flange 168 to its position of FIGURES 2 and 3 against the seat 172. Recovery or controlled return of the piston and cylinder toward their normal positions then occurs as indicated by the inclined portion of the curve entitled "controlled return," but before this "normal ride position" is reached, another jolt sends the oil pressure upward as the piston and cylinder move toward one another, again followed by a decline representing a controlled return. It is believed that the remainder of the action indicated by the graph of FIGURE 4 is self-evident from the explanatory wording thereon.

The action of the suspension 10 of the present invention in levelling off or flattening the peaks of the oil pressure curves as a result of the operation of the hydropneumatic suspension motors 16 by reason of the combined hydraulic and pneumatic action, is shown in FIGURE 5 as contrasted with the jagged sharp-peaked curve representing diagrammatically the compression and recoil of a conventional spring-operated vehicle suspension in which the shock is not spread out over the comparatively long period of time, both during impact and rebound according to the present invention, as in the lower curve of FIGURE 5. In contrast, the vehicle is subjected to a rapid succession of rises and falls as the spring suspension is successively compressed and rebounds, giving a violent riding action until the shock is fully cushioned by the damping or decreasing amplitude of action of the spring suspension.

What I claim is:

1. A hydropneumatic vehicle suspension system, comprising
    a vehicle body,
    an axle assembly disposed beneath said vehicle body,
    a ground wheel rotatably mounted on said axle assembly,
    and a hydropneumatic suspension motor mounted adjacent said ground wheel in interconnecting relationship between said axle assembly and said vehicle body,
    said motor including
        a cylinder having a cylinder bore with closed and open ends,
        a restrained piston having a piston head reciprocably mounted in said cylinder bore and defining with its closed end an inner chamber containing hydraulic fluid,
        said restrained piston having a hollow restraining piston rod extending from said piston head outwardly through said open end of said cylinder to a closed outer end and containing a longitudinal bore,
    a free piston floatingly mounted in said restrained piston rod bore and defining with said piston head a middle chamber containing hydraulic fluid and defining with said closed piston rod end an outer chamber containing a compressed pneumatic fluid,
    and means including yieldingly-urged constant-speed flow-control valve means in said piston head having a valve passageway of variable cross-sectional area interconnecting said inner and middle chambers,
        said valve means being responsive to the flow of hydraulic fluid in one direction between said middle chamber and said inner chamber resulting from relative motion in one direction between said cylinder and said restrained piston for varying the effective cross-sectional area of said valve passageway to maintain a substantially constant rate of flow of hydraulic fluid through said valve passageway in said one direction of hydraulic fluid flow,
        said hollow piston rod containing a sleeve of resilient material spaced radially inward therefrom and means for connecting the space between said hollow piston rod and the exterior of said sleeve with said outer chamber,
        and said free piston being reciprocably mounted within said sleeve.

2. A hydropneumatic vehicle suspension system, according to claim 1, wherein there is additionally provided a relatively low pressure spring disposed between said free piston and said closed end of said hollow piston rod in engagement with said free piston.

3. A hydropneumatic vehicle suspension system, comprising
    a vehicle body,
    an axle assembly disposed beneath said vehicle body,
    a ground wheel rotatably mounted on said axle assembly,
    and a hydropneumatic suspension motor mounted adjacent said ground wheel in interconnecting relationship between said axle assembly and said vehicle body,
        said motor including a cylinder having a cylinder bore with closed and open ends, a restrained piston having a piston head reciprocably mounted in said cylinder bore and defining with its closed end an inner chamber containing hydraulic fluid, said restrained piston having a hollow restraining piston rod extending from said piston head outwardly through said open end of said cylinder to a closed outer end and containing a longitudinal bore, a free piston floatingly mounted in said restrained piston rod bore and defining with said piston head a middle chamber containing hydraulic fluid and defining with said closed piston rod end an outer chamber containing a compressed pneumatic fluid, and means including yieldingly-urged constant-speed flow-control valve means in said piston head having a valve passageway of variable cross-sectional area interconnecting said inner and middle chambers, said valve means being responsive to the flow of hydraulic fluid in one direction between said middle chamber and said inner chamber resulting from relative motion in an opening direction of said cylinder and said restrained piston away from one another for reducing the effective cross-sectional area of said valve passageway to maintain a substantially constant rate of flow of hydraulic fluid through said valve passageway in said one direction of hydraulic fluid flow, said first-mentioned means including an auxiliary pressure-reponsive hydraulic fluid flow-regulating valve mounted in said piston head and operative to concontrol flow of hydraulic fluid through said piston head in the opposite direction of such flow from the direction of such flow through said valve means, said auxiliary valve including an auxiliary valve passageway interconnecting the opposite sides of said piston head between said inner and middle chambers and also including a valve plunger yieldingly mounted for motion into and out of closing relationship with said auxiliary valve passageway.

4. A hydropneumatic vehicle suspension system, comprising a vehicle body, an axle assembly disposed beneath said vehicle body, a ground wheel rotatably mounted on said axle assembly, and a hydropneumatic suspension motor mounted adjacent said ground wheel in interconnecting relationship between said axle assembly and said vehicle body, said motor including a cylinder having a cylinder bore with closed and open ends, a restrained piston having a piston head reciprocably mounted in said cylinder bore and defining with its closed end an inner chamber containing hydraulic fluid, said restrained piston having a hollow restraining piston rod extending from said piston head outwardly through said open end of said cylinder to a closed outer end and containing a longitudinal bore, a free piston floatingly mounted in said restrained piston rod bore and defining with said piston head a middle chamber containing hydraulic fluid and defining with said closed piston rod end an outer chamber containing a compressed penumatic fluid, and means including yieldingly-urged constant speed flow control valve means in said piston head having a valve passageway of variable cross-sectional area interconnecting said inner and middle chambers, said valve means being responsive to the flow of hydraulic fluid in one direction between said middle chamber and said inner chamber resulting from relative motion in one direction between said cylinder and said restrained piston for varying the effective cross-sectional area of said valve passageway to maintain a substantially constant rate of flow of hydraulic fluid through said valve passageway in said one direction of said hydraulic fluid flow, said piston head including a check valve connected in series with said valve means, said check valve opening in the direction of flow through said valve means and closing in the opposite direction thereto.

5. A hydropneumatic vehicle suspension system, comprising a vehicle body, an axle assembly disposed beneath said vehicle body, a ground wheel rotatably mounted on said axle assembly, and a hydropneumatic suspension motor mounted adjacent said ground wheel in interconnecting relationship between said axle assembly and said vehicle body, said motor including a cylinder having a cylinder bore with closed and open ends, a restrained piston having a piston head reciprocably mounted in said cylinder bore and defining with its closed end an inner chamber containing hydraulic fluid, said restrained piston having a hollow restraining piston rod extending from said piston head outwardly through said open end of said cylinder to a closed outer end and containing a longitudinal bore, a free piston floatingly mounted in said restrained piston rod bore and defining with said piston head a middle chamber containing hydraulic fluid and defining with said closed piston rod end an outer chamber containing a compressed pneumatic fluid, and means including yieldingly-urged constant speed flow control valve means in said piston head having a valve passageway of variable cross-sectional area interconnecting said inner and middle chambers, said valve means being responsive to the flow of hydraulic fluid in one direction between said middle chamber and said inner chamber resulting from relative motion in one direction between said cylinder and said restrained piston for varying the effective cross-sectional area of said valve passageway to maintain a substantially constant rate of flow of hydraulic fluid through said valve passageway in said one direction of hydraulic fluid flow, said piston head containing an opening therethrough with a valve seat, a movable valve body movably mounted in said piston head for travel into and out of closing engagement with said valve seat, and resilient means urging said valve body into closing relationship with said seat, said flow-control valve means being mounted in said valve body and movable unitarily therewith.

References Cited by the Examiner

UNITED STATES PATENTS

| 1,907,162 | 5/33 | Webb | 137—504 |
| 2,161,811 | 6/39 | Grebe | 267—8 X |
| 2,885,202 | 5/59 | Trumper | 267—64 X |
| 2,908,508 | 10/59 | Brunsdon et al. | 280—124 |
| 2,914,338 | 11/59 | Kress | 280—124 X |
| 2,923,557 | 2/60 | Schilling et al. | 267—64 X |
| 3,079,897 | 3/63 | Kirsch | 188—96 |

FOREIGN PATENTS

| 682,110 | 11/52 | Great Britain. |
| 119,773 | 7/47 | Sweden. |

ARTHUR L. LA POINT, *Primary Examiner.*